Feb. 3, 1959 W. C. HOWARD 2,871,869
TIME-CYCLE CONTROL SYSTEM
Filed July 18, 1956 3 Sheets-Sheet 1

INVENTOR.
WILLIAM C. HOWARD
BY Arthur L. Wade
ATTORNEY

Feb. 3, 1959          W. C. HOWARD          2,871,869

TIME-CYCLE CONTROL SYSTEM

Filed July 18, 1956          3 Sheets-Sheet 2

INVENTOR.
WILLIAM C. HOWARD
BY
*Arthur L. Wade*
ATTORNEY

INVENTOR.
WILLIAM C. HOWARD
BY Arthur L. Wade
ATTORNEY

United States Patent Office 2,871,869
Patented Feb. 3, 1959

2,871,869

TIME-CYCLE CONTROL SYSTEM

William C. Howard, Gates Mills, Ohio, assignor to Bailey Meter Company, a corporation of Delaware Application July 18, 1956, Serial No. 598,666

12 Claims. (Cl. 137—82)

The present invention is directed to time-cycle control of variables.

Initially, a definition of time-cycle control, as understood by the inventor, is offered. Basically, the object of this control is to vary the magnitude of a variable over an established period of time in accordance with a predetermined program. The variable controlled is measured and compared with a force proportional to the desired program value for the variable. A comparative structure responds to the measured variable and proportional force to establish an output representative of their difference. The output is applied to the control of the supply of an agent which alters the magnitude of the variable.

Many industrial processes require control of flows, levels, temperatures or other variables in accordance with predetermined programs for their magnitudes. The present invention provides this control by measuring the variable in terms of fluid pressure and continuously comparing this fluid pressure with a fluid pressure established to vary on a predetermined program. The comparing structure for the two fluid pressures, in turn, establishes a single control fluid pressure which is applied to control of the agent supply in matching the magnitudes of the variable fluid pressure and program fluid pressure.

The drawings disclose the preferred embodiment of the invention. This embodiment utilizes, and establishes, pneumatic pressures in attaining its objects. The measured and program variables are attained in terms of pneumatic pressures which are continuously compared in a relay capable of introducing proportional, reset and rate characteristics to its output pneumatic control pressure. The program pressure can be conveniently isolated from the relay and a manually adjusted pneumatic pressure substituted therefor. Additionally, the program pressure can be biased in value by manually adjusted structure to supplement, or modify, the predetermined program for the variable.

The basic arrangement of directly, and separately, establishing fluid pressures representative of the variable measured, and a program value for the variable, permits the convenient recordation of the values. If the variable deviates from the program because of some malfunction not immediately discernable and correctable, the substituted, manually established fluid pressure, may be utilized to keep the variable within satisfactory limits, using the records as a guide.

To establish the pneumatic pressure representative of the program value for the variable, a generator is disclosed, having a source of constant power. The generator, more specifically, comprises a mechanically actuated pneumatic pressure transmitter positioned by a constant-speed motor through a cam. Variations in the transmitter output can be programmed by giving a particular profile to the cam. The present invention demonstrates the use of a simple constant-rise cam, the program variations being determined by the rate at which the cam is rotated and the time a preselected value of transmitter output is held constant. The selection of cam rotation rates, and hold-time, for transmitter output, being infinite, within specified ranges of operation, provides a completely flexible program controller.

In order to vary the rate of cam rotation by a constant-speed motor, a predetermined rate of intermittent energization is provided for the motor. Structure is provided to apply the energization to motor windings which rotate it in opposite directions. Additionally, structure is provided to interrupt the energization for a predetermined period of time.

A generalized object of the invention, then, is to control a variable on a time-cycle basis.

A further object is to control a variable on a time-cycle basis by use of a program fluid pressure.

A further object is to control a variable by a fluid pressure established as a relay output created by comparing a program fluid pressure and a force established as representative of the magnitude of the variable to be programmed.

A further object is to provide a program fluid pressure with a predetermined rate of increase and a predetermined rate of decrease.

A further object is to provide a program fluid pressure with a predetermined rate of increase and a predetermined rate of decrease and with a predetermined value which can be held for a predetermined period of time.

The invention is disclosed in a manner calculated to give those skilled in the art an initial grasp of how the invention is used by an operator and the scope of the results that can be obtained by an operator. The components that are manually manipulated to apply the invention are illustrated. A chart of the results that can be achieved is offered. Finally, the complete arrangement of the essential elements in the combination of the preferred embodiment is explained.

OPERATION FROM THE CONTROL PANEL

Figure 1:
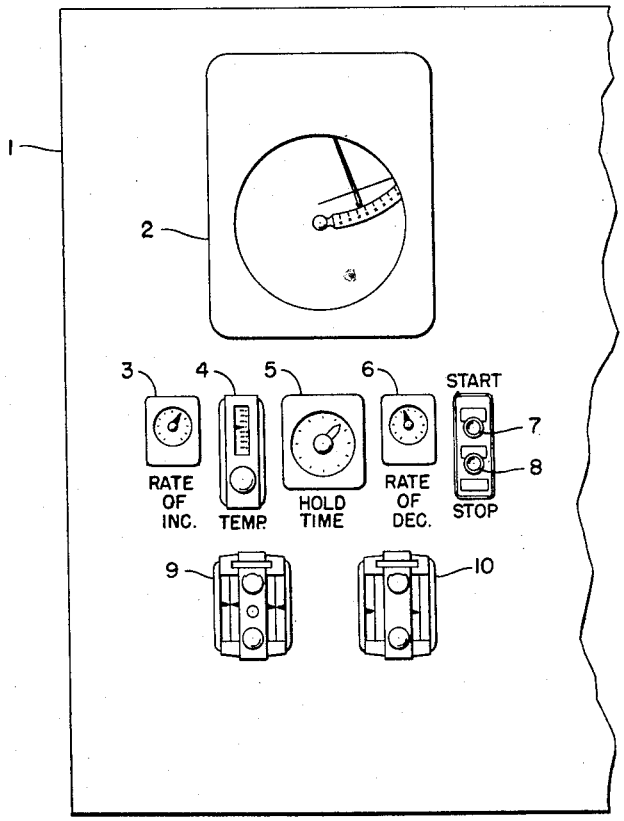
Fig. 1 illustrates panel-mounting of the components with which the value of the program pneumatic pressure is determined.

Fig. 1 illustrates a panel board 1 in elevation. An operator at this board observes a recorder 2 upon whose chart is exhibited the magnitude of the variable controlled and the magnitude of the force proportional to the desired program value for the variable. The position of the mechanical linkage between the motor and fluid pressure generator, or pneumatic pressure transmitter, may also be manifested on the chart, if desired.

Directly below the recorder 2 are mounted the manually manipulated instruments with which the operator sets a desired program for the variable. By pressing the push-buttons, setting the dials of these instruments, and manipulating the various knobs of the selector valves, the value of the program variable can be controlled automatically, or manually, at the will of the operator.

The disclosure demonstrates how the temperature of a flowing medium, as the variable, is programmed. It takes but little imagination to visualize the heated flowing medium as having passed through a heat exchanger. Heat picked up in the exchanger comes from a heating fluid flowing through the exchanger, as the agent supplied to alter the magnitude of the variable. The embodiment of the invention disclosed automatically opens and closes a valve in the conduit of the heating agent to vary the quantity to the exchanger and to alter the temperature of the heated medium in accordance with the desired program.

The instruments below recorder 2 have been arranged in a logical sequence. The dial of instrument 3 is set for the desired rate of increase in temperature. The maximum temperature to be reached is set with instrument 4. The length of time the maximum temperature is to be held is set on the dial of timer 5. The rate desired for the temperature decrease is dialed on instrument 6. The program is started by depressing push-button 7.

Should it be desired to hold the temperature at any value attained, for an arbitrary period of time, push-button 8 is pressed. Selector station 9 can be employed to carry out a manually-determined program, or to bias the program automatically being carried out by the settings of instruments 3, 4, 5 and 6. Selector station 10 is provided with which to directly take over the manual control of the heating agent from the entire control system.

CHART OF THE SYSTEM FUNCTIONS

Figure 2:
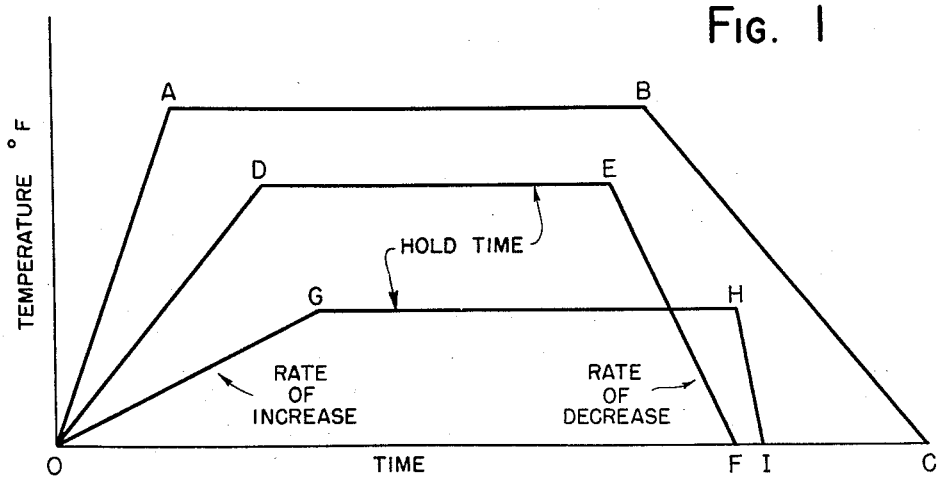
Fig. 2 is a magnitude-time chart of the variable controlled by the program pneumatic pressure.

Fig. 2 shows some of the results made possible by the invention. The end result of temperature variation of the heated flowing medium, with respect to time, is analyzed. Curve O—A—B—C may be regarded as the maximum performance of the system illustrated. Plot O—A represents the maximum rate of increase to be gained by a setting of instrument 3. Plot A—B represents both the maximum temperature that can be gained by a setting of instrument 4 and the maximum length of time this temperature can be held by timer device 5. Plot B—C represents the slowest rate of temperature decrease that can be expected by setting instrument 6 to return the system to the beginning of its program cycle.

Curves O—D—E—F and O—G—H—I are two of the infinite number of cycles which can be expected from automatic operation of the system. Therefore, plots O—A, O—D, O—G are part of a family of rate-of-increase curves. Plots A—B, D—E and G—H are a portion of various hold-times available. Finally, plots B—C, E—F and H—I are part of a family of rate-of-decrease curves. The number of variations are endless, within the capacities of the units of the control system and mechanism it automatically controls.

OPERATION OF THE COMPLETE SYSTEM

Figure 3:
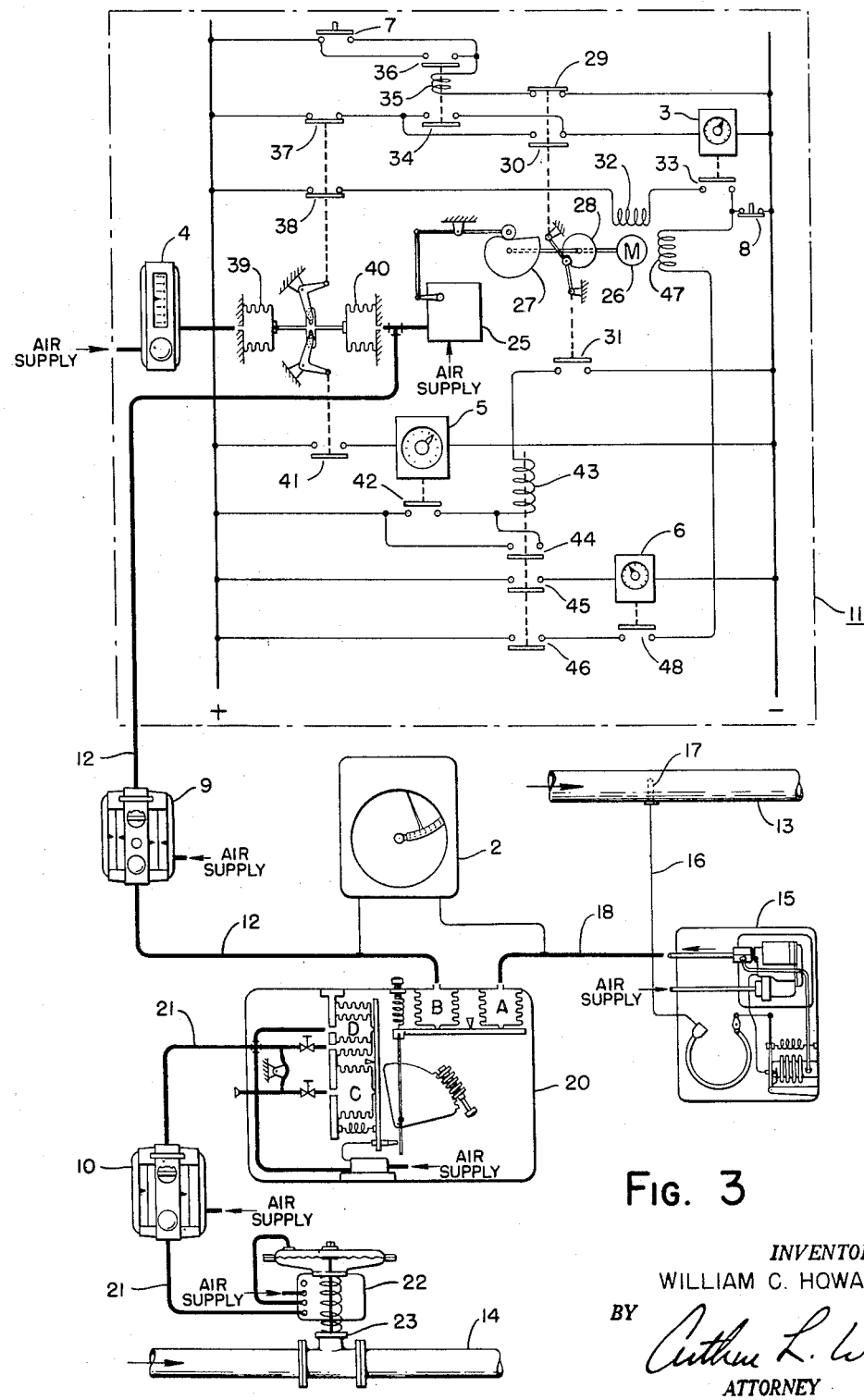
Fig. 3 is a somewhat diagrammatic control system layout of the preferred embodiment of the invention.

Fig. 3 discloses the complete embodiment of the invention. A conduit is illustrated for the flowing heated medium, a conduit for the flowing heating medium, and the valve in the latter conduit for regulating the quantity of heating medium supplied. Measurement of the temperature of the heated medium is illustrated, along with the establishment of a pneumatic pressure representative of the temperature. A second pneumatic pressure is shown as established by a pneumatic pressure transmitter of a program controller in accordance with the predetermined program. The two pneumatic pressures are compared, and a final control pneumatic pressure applied to the positioning of the valve in the conduit of the heating medium.

The essential elements of the novel combination are within controller 11. Program controller 11 establishes a program force, expressed in terms of a pneumatic pressure, in pipe 12. Disregarding, for the moment, the details of the structure establishing the pneumatic pressure in pipe 12, an analysis of the remainder of the complete system will give appreciation of the role of controller 11. This analysis extends from consideration of the desired temperature of the medium within conduit 13 to its control by regulation of the heating medium in conduit 14.

To be more specific, transmitter 15 receives the pressure of pipe 16 within a Bourdon tube for mechanical movement of one-half of a pneumatic pressure couple. The output of this pneumatic pressure couple is amplified by a relay which is applied to move the second half of the pneumatic pressure couple and cause it to follow the first half and simultaneously establish the transmitter output. The Bourdon tube, pipe 16 and temperature-sensing bulb 17 form a completely closed gas pressure system. Variations of pressures within this system are directly related to the temperature to which bulb 17 is exposed in conduit 13. The internal structure of transmitter 15, represented somewhat diagrammatically here, is disclosed and claimed in Gorrie et al. 2,737,963. The output of this transmitter is established in pipe 18 as representative, over a finite range, of temperature values to which bulb 17 is exposed.

Recorder 2, mounted on panel 1, is illustrated as responsive to the pneumatic pressures in pipes 12 and 18. The mechanism within recorder 2, responsive to these pneumatic pressures, is adequately illustrated in copending application of Panich S. N. 408,725, filed February 8, 1954, now Patent No. 2,805,682. Normally, an operator observing the manifestation of these values on recorder 2 expects the variations in pipe 12 to be matched by those in pipe 18, delayed only by the time constants of the components of the controlled units of the system.

Relay 20 responds to the difference between the pressures of pipes 12 and 18. The pressures are received, specifically, in bellows A and bellows B, opposed across the fulcrum of their beam. Differences between the two pressures will result in a movement of the A—B beam and an attached half of a pneumatic pressure couple, against the force of a spring. The output of the pneumatic couple is applied to a second beam to position the second half of the couple towards the first half and simultaneously become the relay output. The mechanism of relay 20, disclosed diagrammatically here, is specifically disclosed and claimed in applications Gorrie S. N. 311,098, filed September 23, 1952, now Patent 2,776,669, and Panich S. N. 392,132, filed November 16, 1953, now Patent 2,805,678. Relays of this type are capable of providing proportional-reset-rate characteristics to their outputs. The output of relay 20 is established in pipe 21, routed through selector station 10, and applied to positioner 22 of valve 23 for regulating the heating medium in conduit 14.

As indicated supra, it may become advisable to completely isolate regulation of valve 23 from the time-cycle control system. Further, it may be advisable to substitute a manually controlled fluid pressure for that established by relay 20 in pipe 21. Selector station 10 is employed in pipe 21 for this purpose. The specific function of this structure may be further appreciated by consideration of Dickey et al. 2,729,222.

Whatever the source of supply of pneumatic pressure in pipe 21, positioner 22 responds thereto. Pneumatic pressure to which positioner 22 responds establishes the position of valve 23 in the regulation of the heating medium in conduit 14. Gorrie et al. 2,679,829 discloses the structure of this positioner.

ESTABLISHMENT OF THE PROGRAM PRESSURE

The results obtained by establishing a program pneumatic pressure in pipe 12, and bellows B of relay 20, are now clear. For every value of pneumatic pressure established, the control system responds to produce a corresponding value of temperature in the heated medium flowing in pipe 13. This normal operation may be interrupted by the use of selector station 10. In normally carrying out the program, the pneumatic pressure in pipe 12 is the so-called "set-point" of the control system. The combination of structure with which the invention is given embodiment to establish this pneumatic pressure will now be analyzed in Fig. 3.

The transmitter-motor combination

The structure of program controller 11 is centered about the operation of pneumatic pressure transmitter 25. Transmitter 25 is a mechanical-pneumatic device. Linkage of the transmitter is mechanically actuated to develop a pneumatic output pressure. This output pressure is imposed on pipe 12 to become the output of both the program controller 11 and transmitter 25. The end result sought by the structure of program controller 11 is the actuation of transmitter 25 in forming a program set-point for comparing relay 20.

The source of mechanical power for transmitter 25 is motor 26. The mechanical motion of motor 26 is applied to transmitter 25 through cam 27. If the profile of cam 27 is given a constant rise characteristic, turning it at a constant rate by motor 26 will develop a transmitter 25 output which will increase linearly at a rate determined by the speed of motor 26. Control of the circuit of motor 26 is, therefore, of prime importance.

Timing disc

Before proceeding with the analysis of the control of circuits of motor 26, it should be pointed out that timing disc 28 is rotated with cam 27 in order to index the end points of the program. Disc 28 is a simple switch-actuator having a notch into which the linkage of an electric, multi-contact, switch falls at the beginning-end of the program.

The multi-contact switch is characterized by switches 29, 30 and 31. Actuation of these switches at the beginning of the program cycle permits the automatic development of the program by controller 11. Actuation of the switches 29, 30 and 31 at the completion of the program cycle marks the end of automatic operation of controller 11. The notch of disc 28 is a positive index for the end points of the program.

Rate of increase

When energized, windings 32, of motor 26, will rotate the motor in a clockwise direction (CW). The circuit of winding 32 is completed through switch 33. If switch 33 is made and broken with predetermined frequency, motor 26 will be rotated CW at a predetermined rate. Switch 33 is controlled by interrupter 3, mounted on panel 1. One form that interrupter 3 may take is disclosed in Bulletin 360, dated July 1950 by the Eagle Signal Corporation, Moline, Illinois. As previously indicated, an operator, at panel 1, may set this instrument to actuate switch 33 at a predetermined rate. When interrupter 3 is energized, the result is a rotation of motor 26 at a predetermined rate and the development of a pneumatic pressure in pipe 12 which will increase at a linear rate.

Control of the power supply of interrupter 3 is next given attention. The circuit with line supply is completed through either switch 30 or switch 34. Switch 34 is controlled by solenoid coil 35 and the circuit of coil 35 may be initially energized through pushbutton 7, located on panel 1. Therefore, manual completion of switch-pushbutton 7 causes coil 35 to make switch 34 and supply power to the circuit of increase interrupter 3. The result is an increasing set-point pneumatic pressure in pipe 12 which causes comparing relay 20 to position valve 23 to vary the temperature in conduit 13 in accordance with the rate determined by the setting on interrupter 3. Plots O—A, O—D and O—G represent the variety of rates of increase possible by an operator manually setting interrupter 3.

When pushbutton 7 energizes the circuit of coil 35, coil 35 makes switch 34 and switch 36 simultaneously. With the manual release of pushbutton 7, coil 35 will remain energized through switch 36. Coil 35 will remain energized until switch 29 is broken by its actuating linkage emerging from the notch of disc 28. At the same time that switch 29 is broken, switch 30 is made, so, although switch 34 is also broken by switch 29 opening to de-energize coil 35, switch 30 maintains the power of supply to interrupter 3 during the subsequent rate of increase portion of the program.

With control of the circuit of interrupter 3 transferred from coil 35 to disc 28, switches 34 and 36 are returned to their position for starting the program. The circuit of interrupter 3 will thus remain energized until the output of transmitter 25 reaches a predetermined value which will cause the break of switch 37. At the same time switch 37 is broken, switch 38, in the circuit of motor winding 32, is broken to insure positive deenergization of the clockwise winding 32 of motor 26.

Establishment of maximum value

The maximum value to which the program value will rise is established by the setting of instrument 4 on panel 1, by an operator. Instrument 4 is commonly referred to as a manual loader, essentially comprised of a mechanical-pneumatic pressure transmitter which is manually controlled. Manual loader 4 may be essentially regarded as a pneumatic transmitter similar to transmitter 25 with a knob with which to manually adjust its mechanical linkage and a scale upon which its pneumatic pressure output may be observed.

The output of manual loader 4 is established in bellows 39. The force generated in bellows 39 is opposed by the output of transmitter 25 which is placed in bellows 40. Bellows 39 and bellows 40 are opposed through linkage controlling the position of switches 37, 38. With a predetermined value of pneumatic pressure in bellows 39, there is established a definite value of the increasing output of transmitter 25 which will overcome the force of bellows 39 and break switches 37 and 38. Points A, D and G of Fig. 2, are thereby established.

Consideration is next given the time the maximum value in the rate of increase is held in the program.

Establishment of time maximum value is held

When switches 37 and 38 are opened by the differential pneumatic pressure switch of bellows 39, 40, switch 41 is made. The closing of switch 41 energizes the circuit of timer 5, mounted on panel board 1. Timer 5 may take the form of that structure disclosed in Bulletin 120, dated August 20, 1955, of the Eagle Signal Corporation, Moline, Illinois. Energization of timer 5, by the making of switch 41, is at the beginning of a period whose length is manually determined by the setting of the control knob of timer 5. At the end of that time period, timer 5 closes switch 42 for a finite period.

The closure of switch 42 completes the circuit of solenoid coil 43. To appreciate this circuit completion, reference is made back to actuation of switches 29, 30, 31 by disc 28. Switch 31 is closed by disc 28 when motor 26 has started the program on its rate-to-increase portion. Closure of switch 42, by timer 5, now completes the circuit of coil 43 with the source of supply. Coil 43 then closes switches 44, 45 and 46.

Rate of decrease

As timer 5 functions to make switch 42 for a finite period of time, switch 44 is required to maintain the energization of coil 43 after the subsequent opening of switch 42. Closure of switch 45 completes the circuit of rate of decrease interrupter 6 with the line supply. Making of switch 46 enables the circuit of motor winding 47 to be completed by interrupter 6 and rotate motor 26 in a counterclockwise (CCW) direction. Specifically, interrupter 6 controls switch 48 which energizes winding 47 in a manner similar to the energization of winding 32 with switch 33, controlled by rate of increase interrupter 3.

An operator, at panel 1, by setting the dial on interrupter 6, determines the rate at which motor 26 is operated CCW. Actuation of cam 27 by motor 26 thereby establishes the rate of decrease for pneumatic pressures in pipe 12.

The predetermined rate of decrease of pneumatic pressure in pipe 12 establishes the rate of decrease for the temperature in conduit 13. Plots B—C, E—F and H—I are representative of the innumerable rates of decrease available to an operator at panel board 1. After cam 27, and disc 28, have returned to the position shown, the notch in disc 28 opens switch 31 to deenergize coil 43 and open switches 44, 45 and 46. The full cycle of the program for the temperature in conduit 13 is completed.

EMERGENCY CONDITIONS CONTEMPLATED

Switch-pushbutton 8 is provided on panel board 1, should it be desirable, for any reason, to halt the automatic operation of the program controller 11. It is obvious from the circuit arrangement of Fig. 3, that the opening of switch 8 will disconnect both motor winding 32 and motor winding 47 from the line supply. Opening of switch 8, therefore, holds motor 26 in the position it has attained in the automatic operation of the time-cycle system. The pneumatic set-point pressure in pipe 12 will be held at the value it has attained in the program until pushbutton switch 8 has been released.

It is appreciated by those skilled in the art that the program value for the temperature condition in conduit 13 may be distorted by a number of external factors not immediately discernable or correctable. From another viewpoint, the actual magnitude of the variable temperature condition may be forced "out-of-step" with the predetermined program. Comparison of the two records on the chart of recorder 2 allows personnel at panel board 1 to be aware of any out-of-phase condition arising between variable and program for the variable. Corrective action may then be intelligently applied to the system at panel board 1.

Selector station 9 is located in pipe 12. The function of selector station 9 is to permit manual termination of communication between controller 11 and relay 20. Additionally, provision is made for substituting a manually established fluid pressure in the B chamber of relay 20. Finally, selector station 9 permits the addition of a manually determined bias value to the pressure of pipe 12, established in bellows B.

MOUNTING OF MOTOR-TRANSMITTER COMBINATION IN RECORDER 2

Figure 4:
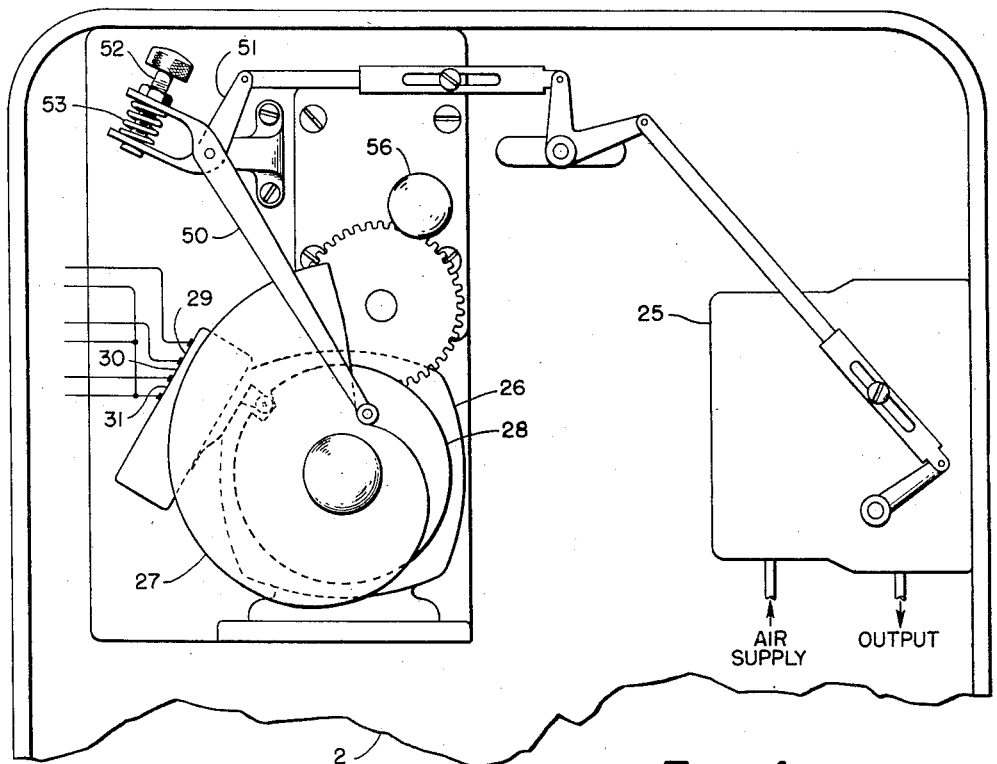
Fig. 4 illustrates the arrangement and mounting of the pneumatic pressure transmitter and motor of the system within an instrument case.

Fig. 4 has been used to depict an actual, practical, relation between motor 26, transmitter 25 and its connecting linkage. The responsive mechanisms for the pressure in pipes 12 and 18 are mounted elsewhere in recorder 2.

Motor 26 is shown mounted within recorder 2, rotating cam 27 and disc 28. Follower arm 50, for cam 27, is pivoted from a point common with that for link 51. The follower and link have their angular relationship determined by the manually adjusted link of screw 52 between them. Screw 52, acting against the force of spring 53, offers a means for conveniently adjusting the angular relationship between cam follower 50 and link 51, should a fixed bias of this nature be desired.

The other portion of the linkage between 51 and transmitter 25 is clear from the disclosure. Slot adjustments determine the length of the various members. It should be readily appreciated that with cam follower 50 tracing the profile of cam 27, the output of transmitter 25 establishes pneumatic pressures proportional to the shape of cam 27.

The switch combination 29, 30, 31, actuated by notch disc 28, is shown in a conventional form.

Figure 5:
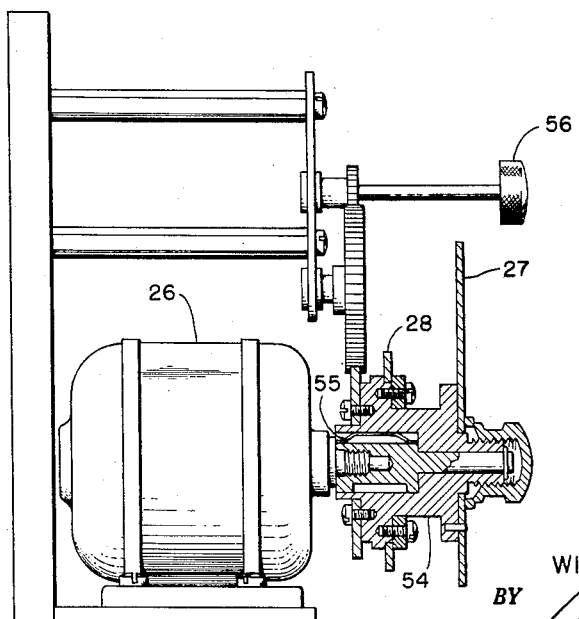
Fig. 5 is a partially sectioned side elevation of the cam and motor units of the system as mounted in the instrument case.

The mounting for disc 28 and cam 27 is more clearly depicted in the partially sectioned elevation of Fig. 5. A common hub 54, for disc 28 and cam 27, is shown as clutched to the shaft of motor 26 through a spring friction coupling 55.

The connecting function of spring friction coupling 55 may be manually overcome at any time by gearing between knob 56 and hub 54. If for some reason, adjustment is required of the normally-fixed relationship between motor 26 and cam 27 and disc 28, the provision of knob 56 is convenient. An operator at panel board 1 can, by manipulation of knob 56, adjust the position of hub 54 on the shaft of motor 26.

What I claim as new and desire to secure by Letters Patent of the United States is:

1. A system for controlling a variable, including; an instrument which responds to a variable to be controlled to establish a first signal representative of the magnitude of the variable; a controller for establishing a second signal and including; an output transmitter mechanically actuated to establish the second signal, a constant speed motor having means to mechanically actuate the transmitter in generating the second signal with a linear variation, means for selecting the direction of motor rotation, means for controlling the rate of rotation of the motor, means for determining the time of motor rotation, and means for selecting the length of time between motor rotations in the selected directions; a comparing means receiving the first and second signals in order to establish a control signal in accordance with the differences between the first and second signals; a regulating means for the variable; and a control means responsive to the control signal for regulating the magnitude of the variable.

2. The system of claim 1 wherein the means with which the motor mechanically actuates the output transmitter establishing the second signal includes, a constant rise cam rotated by the constant speed motor, and linkage between the cam and transmitter.

3. The system of claim 2 in which the means for selecting the direction of rotation of the motor includes, motor windings selectively energized to rotate the motor in one direction or the other, a first set of switches in the winding circuit which selects the direction of motor rotation, and actuating mechanism for switches of the first set positioned by the output transmitter signal.

4. The system of claim 3 wherein the means for controlling the rate of rotation of the motor in the selected direction includes, a second set of switches in the winding circuits, interrupter mechanism for actuating a switch of the second set in each motor winding circuit at predetermined rates, and a circuit for each interrupter mechanism with a source of supply controlled by a switch of the first set.

5. The system of claim 4 in which the first set of switches includes, a first switch in the circuit of a first of the interrupters, a second switch in the circuit of a timing mechanism, a third switch closed by the timing mechanism for a finite period of time after a predetermined interval of time following closure of the second switch, and a fourth switch in the circuit of the second interrupter which is actuated by a first solenoid coil whose circuit is completed through the third switch.

6. The system of claim 5 including, a holding switch in the circuit of the first solenoid coil whose circuit is completed through the third switch of the first set by the timing mechanism for a finite period of time.

7. The system of claim 6 including, a switch actuator positioned by the constant speed motor; a third set of switches controlled by the switch actuator including; a first switch in the circuit of the first interrupter, and a second switch in the circuit of the solenoid coil whose circuit is completed through the third switch of the first set; and in which the switch actuator of the third set is arranged to complete the first and second switch of the third set when the constant speed motor is actuating the transmitter.

8. The system of claim 7 in which the first signal is a fluid pressure, the controller establishes the second signal as a fluid pressure, the output transmitter is a fluid pressure transmitter establishing the second signal as a fluid pressure, and the comparing means is a comparing relay establishing a regulating fluid pressure as the control signal.

9. The system of claim 8 in which the means for determinating the time of motor rotation and the actuating mechanism for the first set of switches comprises, a differential pressure responsive mechanism including, a first bellows receiving the output fluid pressure transmitter signal, a second bellows receiving a manually determined fluid pressure signal, and linkage positioned by the bellows to actuate switches of the first set.

10. The system of claim 9 including, a second solenoid coil, which is energized through a manually actuated switch when its circuit is completed through the third switch of the third set when the constant speed motor is not actuating the transmitter, a first switch actuated by the second solenoid coil and paralleling the first switch in the circuit of the interrupter, and a second switch in the circuit of the second solenoid coil parallel with the manually actuated switch.

11. In a system for controlling a variable, the combination comprising an instrument for establishing a first signal representative of the magnitude of the variable, a transmitter for establishing a second signal, means including a constant speed electric motor operatively connected to said transmitter and rotatable in one direction to actuate said transmitter to vary said second signal from a first value to a second value in accordance with a predetermined program, comparing means responsive to said first and second signals for establishing a control signal in accordance with the difference between said first and second signals, means for deenergizing said motor for a predetermined time upon the occurrence of said second value, and means operative at the end of said predetermined time to effect rotation of said motor in a reverse direction to vary said second signal from said second to said first value in accordance with said program.

12. A system for controlling the variable as claimed in claim 11 wherein the means for actuating said transmitter includes a cam rotated by said motor and operatively connected to said transmitter.

References Cited in the file of this patent

UNITED STATES PATENTS

| | | |
|---|---|---|
| 2,282,226 | Hoop | May 5, 1942 |
| 2,495,844 | Hornfeck | Jan. 31, 1950 |
| 2,701,292 | Lincoln | Feb. 1, 1955 |
| 2,767,724 | Howard | Oct. 23, 1956 |